(12) United States Patent
Weigert et al.

(10) Patent No.: US 10,953,712 B2
(45) Date of Patent: Mar. 23, 2021

(54) AUTOMATICALLY LOCKING HITCH

(71) Applicant: GM Global Technology Operations LLC, Detroit, MI (US)

(72) Inventors: Norman J. Weigert, Oshawa (CA); Ralph D. Schlottke, Oshawa (CA); Nash Escalada, Oshawa (CA); Kenneth Jordan Weber, Oshawa (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 155 days.

(21) Appl. No.: 16/410,392

(22) Filed: May 13, 2019

(65) Prior Publication Data
US 2020/0361260 A1   Nov. 19, 2020

(51) Int. Cl.
| | |
|---|---|
| *B60D 1/06* | (2006.01) |
| *B60D 1/36* | (2006.01) |
| *B60D 1/64* | (2006.01) |
| *B60D 1/38* | (2006.01) |
| *B60D 1/167* | (2006.01) |

(52) U.S. Cl.
CPC .............. *B60D 1/363* (2013.01); *B60D 1/065* (2013.01); *B60D 1/167* (2013.01); *B60D 1/38* (2013.01); *B60D 1/64* (2013.01); *B60Y 2300/28* (2013.01)

(58) Field of Classification Search
CPC .......... B60D 1/363; B60D 1/36; B60D 1/366; B60D 1/167; B60D 1/06; B60D 1/065; B60D 1/60; B60D 1/62; B60D 1/64; B62D 53/12
USPC .................................................. 280/477, 433
See application file for complete search history.

(56) References Cited

U.S. PATENT DOCUMENTS

| | | | | |
|---|---|---|---|---|
| 5,788,257 A | * | 8/1998 | Meyerhofer | ........... B60D 1/065 280/416.1 |
| 2016/0075197 A1 | * | 3/2016 | Coleman | ............ B62D 53/0864 280/433 |

* cited by examiner

*Primary Examiner* — Ruth Ilan
*Assistant Examiner* — Hosam Shabara (57) ABSTRACT

A hitch assembly for coupling a trailer to a tow vehicle comprises a king ball including a base and a king pin extending vertically from a top surface of the base, the king pin including a ball positioned on a distal end opposite the base, the ball adapted to be pivotally received into a hitch of the trailer. A hitch block includes a draw bar and a housing, the drawbar adapted to be horizontally inserted into a receiver mounted onto the tow vehicle, the housing including a throat adapted to receive the base of the king ball. A locking mechanism is adapted to automatically engage the king pin when the base of the king ball is inserted into the throat of the housing to secure the base of the king ball within the throat of the housing and locking the king ball and the hitch block together.

19 Claims, 4 Drawing Sheets

AUTOMATICALLY LOCKING HITCH

INTRODUCTION

The present disclosure relates to a hitch assembly for coupling a trailer to a tow vehicle. There are two main types of trailer hitches, bumper pull and gooseneck or 5$^{th}$ wheel style. Bumper pull hitches are most commonly used for recreational and light commercial applications. Many SUVs, trucks, and even larger cars come with the ability to bumper pull a trailer from day one. Gooseneck or 5$^{th}$ wheel style hitches are used for larger applications such as 5$^{th}$ wheel campers, and commercial tractor/trailer trucks. Gooseneck hitches, or 5$^{th}$ wheel hitches, use a heavy-duty system that fits into the bed of a pickup truck equipped to tow this way.

Most recreational users choose bumper pull hitches because they are easier, and most trailers on the road use them. They do not require the installation of additional hardware. Since the trailer is generally a small RV or utility type trailer, less money is invested up front to set the system up. A bumper pull hitch uses a traditional ball and hitch system to tow. A receiver is mounted to the rear of a tow vehicle, either to the rear bumper, or directly to the frame of the tow vehicle. A ball mount can be secured inside the receiver and held with a pin. The ball mount includes a ball that fits within a hitch of a trailer to pivotally secure the trailer to the towing vehicle.

When hooking up a bumper pull hitch, the hitch of the trailer is lowered onto the ball of the ball mount. Lights of the trailer are connected to the wiring harness of the tow vehicle, and safety chains are attached between the trailer and the tow vehicle in case the ball mount fails while towing the trailer. Safety chains are almost always legally required when using a bumper pull hitch.

Gooseneck hitches go by many names, including deck over hitches or 5$^{th}$ wheel hitches. The gooseneck hitch has a main plate that is attached to a truck's bed. The trailer hitch fits into it from above, eliminating the use of the bed in the process. This allows the truck to tow a trailer or 5$^{th}$ wheel with a higher weight class. Gooseneck hitches are equipped with an automatic latching/locking mechanism that secures the trailer hitch within the main plate. A primary latching mechanism secures a hitch pin of the trailer, and a secondary latching mechanism secures the primary latching mechanism. The secondary latching mechanism prevents the primary latching mechanism from releasing.

Because gooseneck hitches are designed for relatively larger weight loads, and use a primary and secondary latching mechanism, safety chains are not generally required.

Thus, while current known bumper pull and gooseneck style hitches achieve their intended purpose, there is a need for a new and improved system for coupling a trailer to a tow vehicle that utilizes a primary/secondary latching system that automatically engages to allow the trailer and tow vehicle to be connected, without requiring a driver of the tow vehicle to leave the vehicle, and automatically connects an emergency brake safety cable between the trailer and the tow vehicle and automatically connects the trailer wiring harness to the tow vehicle wiring harness simultaneously.

SUMMARY

According to several aspects of the present disclosure, a hitch assembly for coupling a trailer to a tow vehicle comprises a king ball including a base and a king pin extending vertically from a top surface of the base, the king pin including a ball positioned on a distal end opposite the base, the ball adapted to be pivotally received into a hitch of the trailer. A hitch block includes a draw bar and a housing, the drawbar adapted to be horizontally inserted into a receiver mounted onto the tow vehicle, the housing including a throat adapted to receive the base of the king ball. A locking mechanism is adapted to automatically engage the king pin when the base of the king ball is inserted into the throat of the housing to secure the base of the king ball within the throat of the housing and locking the king ball and the hitch block together.

According to another aspect of the present disclosure, the locking mechanism includes a jaw adapted to automatically engage the king pin when the base of the king ball is inserted into the throat of the housing to secure the base of the king ball within the throat of the housing and lock the king ball and the hitch block together, and a wedge adapted to automatically engage the jaw after the jaw engages the king pin to lock the jaw in engagement with the king pin.

According to another aspect of the present disclosure, the jaw is pivotally mounted in the housing and pivotable between a first jaw position, wherein the base of the king ball can be inserted into the throat of the housing assembly, and a second jaw position, wherein the jaw engages the king pin to prevent the base of the king ball from being removed from the throat of the housing assembly. The wedge is pivotally mounted in the housing and pivotable between a first wedge position, wherein the jaw is freely pivotable between the first and second jaw positions, and a second wedge position, wherein the wedge engages the jaw to lock the jaw in the second jaw position and in engagement with the king pin. The jaw is biased toward the first jaw position and the wedge is biased toward the second wedge position, the jaw including a finger extending therefrom adapted to hold the wedge in the first wedge position when the jaw is in the first jaw position. When the base of the king ball is inserted into the throat of the housing assembly, the king pin contacts the jaw, overcomes the bias of the jaw, and pivots the jaw from the first jaw position to the second jaw position, moving the finger away from the wedge and allowing the wedge to automatically be biased from the first wedge position to the second wedge position.

According to another aspect of the present disclosure, a lever is pivotally mounted within the housing and adapted to selectively pivot the wedge from the second wedge position to the first wedge position.

According to another aspect of the present disclosure, an indicator extending from the lever into a slot formed within the housing assembly, wherein, when the wedge is positioned in the first wedge position the indicator is positioned at a first end of the slot formed within the housing assembly, and when the wedge is positioned in the second wedge position the indicator is positioned at a second end of the slot formed within the housing assembly, opposite the first end.

According to another aspect of the present disclosure, the slot is formed within a top surface of the housing and the indicator is visible in a rear-view camera of the tow vehicle.

According to another aspect of the present disclosure, the hitch block further includes a release handle connected to the lever to move the lever and selectively pivot the wedge from the second wedge position to the first wedge position to unlock the king ball from the hitch block.

According to another aspect of the present disclosure, the hitch block further includes a release cable connected to the lever and extending a distance from the hitch block, the cable adapted to allow the lever to be selectively and remotely actuated to pivot the wedge from the second wedge position to the first wedge position to unlock the king ball from the hitch block.

According to another aspect of the present disclosure, the base of the king ball includes a female 7-pin electrical connector mounted therein, and the housing of the hitch block includes a male 7-pin electrical connector mounted at the rear of the throat, further wherein when the base of the king ball is inserted into the throat of the housing the female 7-pin electrical connector engages the male 7-pin electrical connector.

According to another aspect of the present disclosure, the female 7-pin electrical connector is connected to the wiring harness of the trailer and the male 7-pin electrical connector is connected to the wiring harness of the tow vehicle, wherein when the base of the king ball is inserted into the throat of the housing the wiring harness of the tow vehicle is connected to the wiring harness of the trailer through the hitch assembly.

According to another aspect of the present disclosure, the female 7-pin electrical connector is positioned within a pocket formed in the base of the king ball, the pocket including a spring loaded pivotable door adapted to keep debris from entering the pocket when the king ball is not engaged with the hitch block and to pivot away to allow the male 7-pin electrical connector to enter the pocket and engage the female 7-pin electrical connector when the base of the king ball is inserted within the throat of the housing assembly.

According to another aspect of the present disclosure, the housing includes a plurality of spring loaded doors adapted to keep debris from entering the throat of the housing when the king ball is not engaged with the hitch block and to pivot away to allow base of the king ball to be inserted within the throat of the housing assembly.

According to another aspect of the present disclosure, the housing includes a flexible cover with a slot formed therein, wherein the flexible cover is adapted to keep debris from entering the throat of the housing when the king ball is not engaged with the hitch block, and to flex to accommodate the king pin and allow the base of the king ball to be inserted within the throat of the housing assembly.

According to another aspect of the present disclosure, an inner surface of the throat of the housing has a profile that substantially matches a profile of the outer surface of the base of the king ball, wherein when the king ball is inserted and locked within the throat of the housing assembly, there is substantially no relative movement between the housing and the king ball.

According to another aspect of the present disclosure, the king ball includes attachment points adapted to allow safety chains from the trailer to be attached to the king ball, and the hitch block includes attachment points adapted to allow safety chains from the tow vehicle to be attached to the hitch block.

According to another aspect of the present disclosure, the hitch block includes a clip adapted to connect to an emergency brake cable of the trailer, wherein the emergency brake cable of the trailer is mounted to one of the trailer hitch or the king ball such that when the king ball is inserted into the throat of the housing assembly, the emergency brake cable automatically engages the clip to secure the emergency brake cable to the hitch block.

According to another aspect of the present disclosure, the clip includes a clip cable adapted to connect the clip to the tow vehicle and the clip is mounted onto the hitch block with a breakable attachment, wherein the clip is adapted to break free from the hitch block if the emergency brake cable pulls on the clip.

According to another aspect of the present disclosure, if the king ball breaks free of the hitch block while the tow vehicle and the trailer are moving, the clip and the cable attaching the clip to the tow vehicle are adapted to pull the emergency brake cable of the trailer.

According to another aspect of the present disclosure, the hitch block further includes a release handle to selectively unlock the locking mechanism to release the king ball from the hitch block, and a cable interconnecting the release handle to the clip, wherein actuation of the release handle to unlock the king ball from the hitch block releases the emergency brake cable from the clip.

According to another aspect of the present disclosure, the hitch block further includes a release cable connected to the release handle and extending a distance from the hitch block, the release cable adapted to allow the release handle to be selectively and remotely actuated to unlock the king ball from the hitch block.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
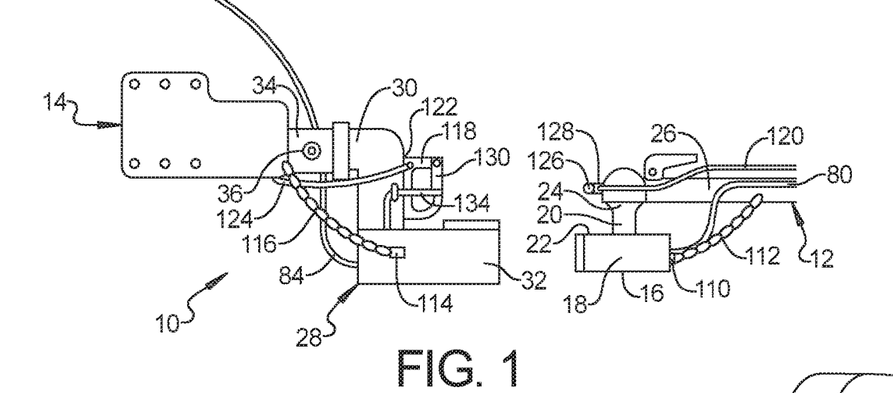
FIG. 1 is side view of a hitch assembly according to an exemplary embodiment.
Figure 2:
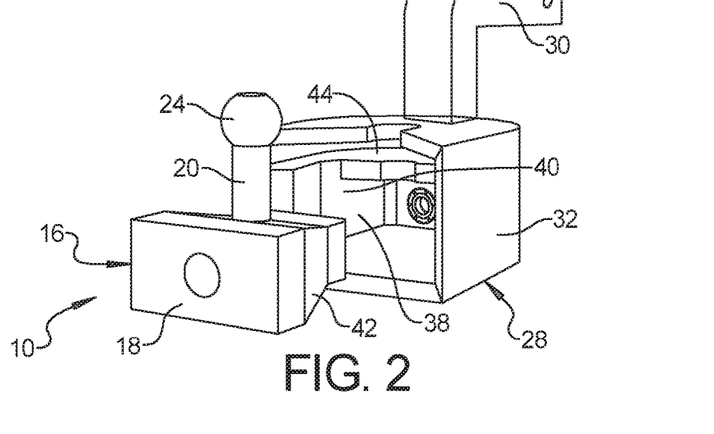
FIG. 2 is a perspective view of the hitch block and the king ball of the hitch assembly shown in FIG. 1.

Referring to FIG. 1 and FIG. 2, a hitch assembly 10 for coupling a trailer 12 to a tow vehicle 14 comprises a king ball 16 including a base 18 and a king pin 20 extending vertically from a top surface 22 of the base 18. The king pin 20 includes a ball 24 positioned on a distal end opposite the base 18. The ball 24 is adapted to be pivotally received into a hitch 26 of the trailer 12.

A hitch block 28 includes a draw bar 30 and a housing 32. The drawbar 30 is adapted to be horizontally inserted into a receiver 34 mounted onto the tow vehicle 14. The draw bar 30 is generally square shaped and sized to fit within a standard receiver, such as a class 1, class 2 or class 3 receiver. The receiver 34 is mounted to the rear of the tow vehicle 14, generally to the rear bumper or directly to the frame of the tow vehicle 14. A pin or bolt 36 secures the draw bar 30 within the receiver 34 and secures the hitch block 28 to the tow vehicle 14.

The housing 32 includes a throat 38 adapted to receive the base 18 of the king ball 16. The throat 38 of the housing 32 defines an inner surface 40. The inner surface 40 of the throat 38 of the housing 32 has a profile that substantially matches a profile of an outer surface 42 of the base 18 of the king ball 16. When the king ball 16 is fully inserted within the throat 38 of the housing 32, the outer surface 42 of the base 18 of the king ball 16 contacts the inner surface 40 of the throat 38 of the housing 32 such that there is substantially no relative movement, side-to-side or up and down, between the housing 32 and the king ball 16.

The housing 32 includes a cavity 44 above and adjacent to the throat 38. A locking mechanism 46 is positioned within the cavity 44 and is adapted to automatically engage the king pin 20 when the base 18 of the king ball 16 is inserted into the throat 38 of the housing 32. The locking mechanism 46 secures the base 18 of the king ball 16 within the throat 38 of the housing 32 and prevents the base 18 of the king ball 16 from being pulled horizontally out of the housing 32, thereby locking the king ball 16 and the hitch block 28 together.

To hitch the trailer 12 to the tow vehicle 14, the king ball 16 is first attached to the hitch 26 of the trailer 12 by inserting the ball 24 of the king pin 20 into the ball receiving portion of the trailer hitch 26. The hitch block 28 is mounted onto the tow vehicle 14 by inserting and securing the draw bar 30 into the receiver 34 of the tow vehicle 14. The driver of the tow vehicle 14 uses a rear-view camera of the tow vehicle 14 to align the hitch block 28 and the king ball 16 and backs the tow vehicle 14 toward the trailer 12. As the tow vehicle 14 backs up toward the trailer 12, the base 18 of the king ball 16 enters the throat 38 of the housing 32 of the hitch block 28 and the locking mechanism 46 secures the king ball 16 to the hitch block 28, thereby securing the trailer 12 to the tow vehicle 14. The locking mechanism 46 engages automatically, so the driver of the tow vehicle 14 is not required to leave the tow vehicle 14 to make any further connections, and may proceed with towing the trailer 12.

Figure 3:
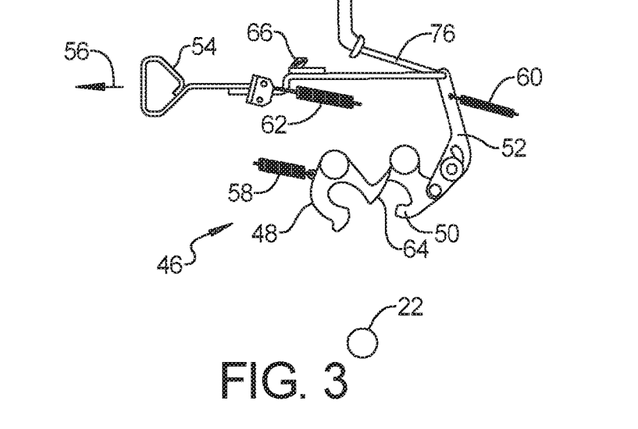
FIG. 3 is a top view of a locking mechanism for a hitch block according to an exemplary embodiment, wherein the locking mechanism is shown removed from the hitch block and without a king ball engaged therein.
Figure 4:
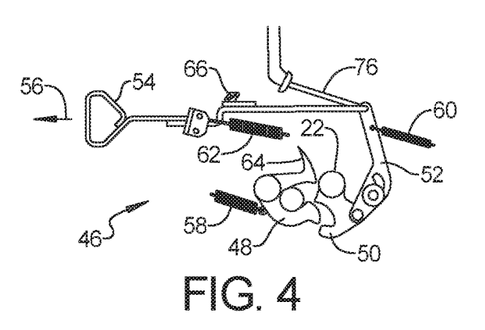
FIG. 4 is a top view of the locking mechanism shown in FIG. 3, wherein a king ball is secured therein.

Referring to FIG. 3 and FIG. 4, the locking mechanism 46 is shown removed from the cavity 44 within the housing 32. The locking mechanism 46 includes a jaw 48 adapted to automatically engage the king pin 20 when the base 18 of the king ball 16 is inserted into the throat 38 of the housing 32. The jaw 48 is a primary locking mechanism that secures the base 18 of the king ball 16 within the throat 38 of the housing 32 and locks the king ball 16 and the hitch block 28 together.

The jaw 48 is pivotally mounted in the cavity 44 within the housing 32. The jaw 48 is pivotable between a first jaw position and a second jaw position. When the jaw 48 is in the first jaw position, as shown in FIG. 3, the base 18 of the king ball 16 can be inserted into the throat 38 of the housing 32. When the jaw 48 is in the second jaw position, as shown in FIG. 4, the jaw 48 engages the king pin 20 to prevent the base 18 of the king ball 16 from being removed from the throat 38 of the housing 32.

The locking mechanism 46 further includes a wedge 50 adapted to automatically engage the jaw 48 after the jaw 48 engages the king pin 20. The wedge 50 is a secondary locking mechanism that locks the jaw 48 in engagement with the king pin 20 to prevent the jaw 48 from becoming dis-engaged from the king pin 20.

The wedge 50 is pivotally mounted in the cavity 44 within the housing 32. The wedge 50 is pivotable between a first wedge position and a second wedge position. When the wedge 50 is in the first wedge position, as shown in FIG. 3, the jaw 48 is freely pivotable between the first and second jaw positions. When the wedge 50 is in the second wedge position, the wedge 50 engages the jaw 48 to lock the jaw 48 in the second jaw position and in engagement with the king pin 20, as shown in FIG. 4.

The jaw 48 is biased toward the first jaw position and the wedge 50 is biased toward the second wedge position. A lever 52 is pivotally mounted within the housing 32. The lever 52 is adapted to selectively pivot the wedge 50 from the second wedge position to the first wedge position. A release handle 54 is attached to the lever 52 to allow the lever 52 to be selectively and manually pulled, as shown by arrow 56, to pivot the wedge 50 from the second wedge position to the first wedge position.

In an exemplary embodiment, the locking mechanism 46 includes three springs 58, 60, 62. A first spring 58 is attached to the jaw 48 at one end and to the housing 32 at an opposite end. A second spring 60 is attached to the lever 52 at one end and to the housing 32 at an opposite end. A third spring 62 is attached to the release handle 54 at one end and secured to the housing at an opposite end. The first spring 58 biases the jaw 48 to the first jaw position. The second and third springs 60, 62 bias the wedge 50 to the second wedge position.

The jaw 48 includes a finger 64 extending therefrom that is adapted to hold the wedge 50 in the first wedge position when the jaw 48 is in the first jaw position. When the base 18 of the king ball 16 is inserted into the throat 38 of the housing 32, the king pin 20 contacts the jaw 48. As the base 18 of the king ball 16 is pushed further into the throat 32, the king pin 20 pushes against the jaw 48, overcomes the bias of the first spring 58, and pivots the jaw 48 from the first jaw position to the second jaw position. As the jaw 48 moves away from the first jaw position, the finger 64 moves away from the wedge 50. When the jaw 48 has moved substantially to the second jaw position, the finger 64 is moved from the path of the wedge 50, and the wedge 50 is automatically biased toward the second wedge position by the second and third springs 60, 62.

Figures 5, 6:
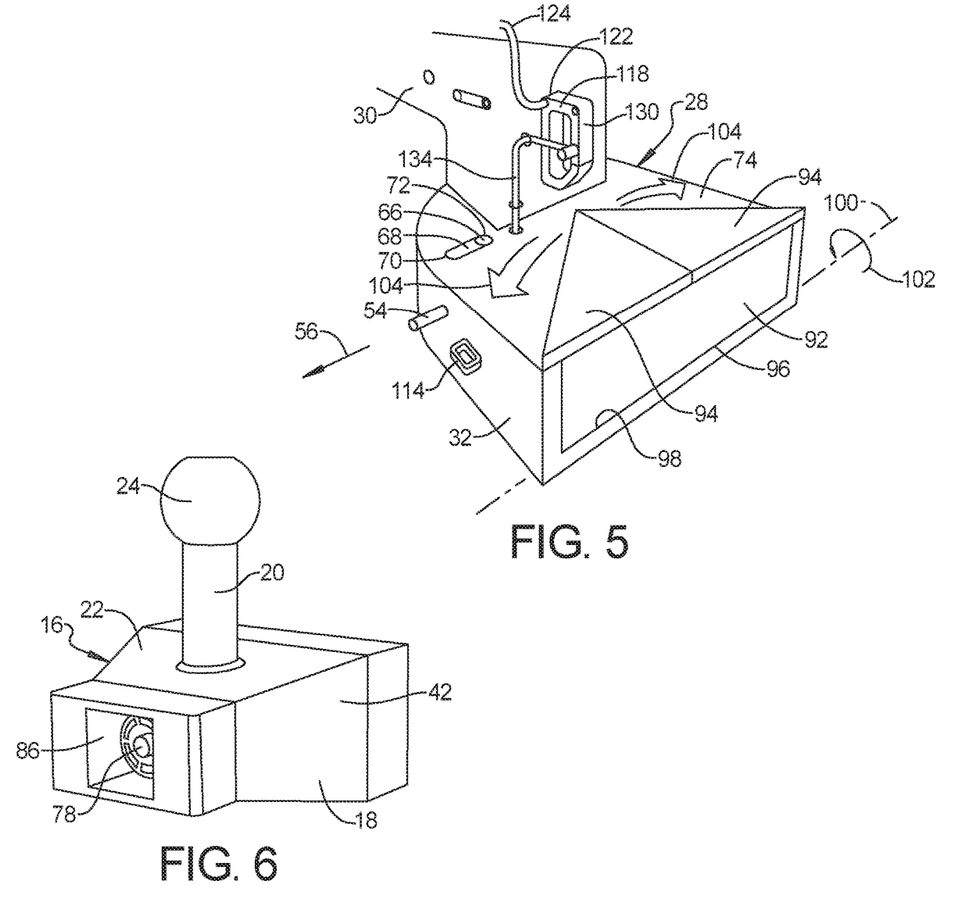
FIG. 5 is a perspective view of a hitch block according to an exemplary embodiment.
FIG. 6 is a perspective view of a king ball according to an exemplary embodiment.

Referring to FIG. 3, FIG. 4, and FIG. 5, in an exemplary embodiment, an indicator 66 extends from one of the release handle 54 and the lever 52 into a slot 68 formed within the housing 32. Movement of the release handle 54 and the lever 52 when the wedge 50 is moved between the first and second wedge positions will move the indicator 66 back and forth within the slot 68. When the wedge 50 is positioned in the first wedge position the indicator 66 is positioned at a first end 70 of the slot 68 formed within the housing 32. When the wedge 50 is positioned in the second wedge position the indicator 66 is positioned at a second end 72 of the slot 68, opposite the first end 70.

Referring to FIG. 5, the indicator 66 is positioned to the right side of the slot 68, at the second end 72 of the slot 68, indicating that the wedge 50 is in the second wedge position, indicating that the jaw 48 and the wedge 50 are engaged and the king pin 20 is locked in engagement with the hitch block 28. Alternatively, if the jaw 48 and the wedge 50 were in the first jaw position and the first wedge position, the indicator 66 would be positioned to the left side of the slot 68, at the first end 70, indicating that the king ball 16 is not secured within the hitch block 28.

The slot 68 is formed within a top surface 74 of the housing 32 so the indicator 66 will be visible in a rear-view camera of the tow vehicle 14. This will allow the driver of the tow vehicle 14 to know when the locking mechanism 46 has secured the king ball 16 to the hitch block 28 and verify that the trailer 12 is secured to the tow vehicle 14. The driver of the tow vehicle 14 can visually verify this without leaving the tow vehicle 14.

In another exemplary embodiment, the hitch block 28 includes a release cable 76 connected to the lever 52 and extending from the hitch block 28. The release cable 76 extends to a position a distance from the hitch block 28, such as within reach of the driver of the tow vehicle 14. The release cable 76 is adapted to allow the lever 52 to be selectively and remotely actuated to pivot the wedge 50 from the second wedge position to the first wedge position to unlock the king ball 16 from the hitch block 28. This will allow the driver of the tow vehicle 14 to dis-engage the locking mechanism 46 to release the trailer 12 from the tow vehicle 14, without leaving the tow vehicle 14.

Figure 7:
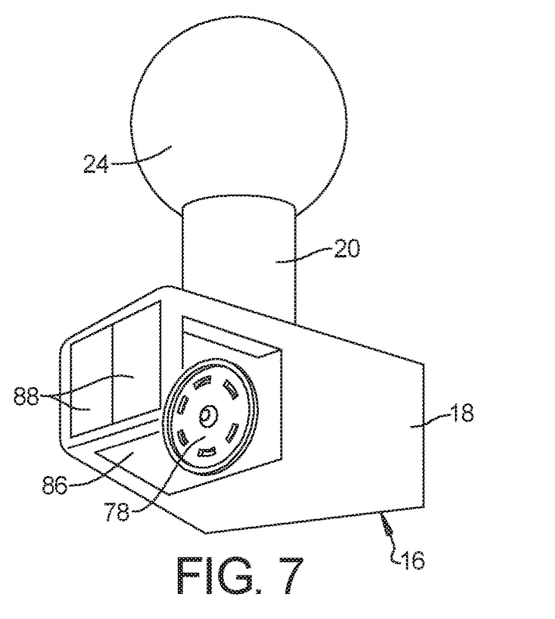
FIG. 7 is a perspective view of a king ball according to an exemplary embodiment.
Figure 8:
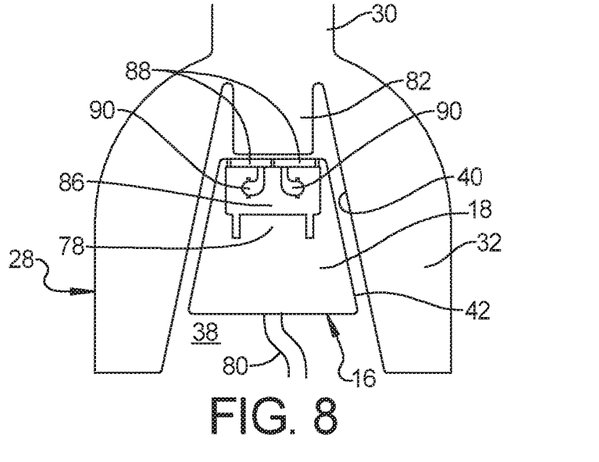
FIG. 8 is a top sectional view of the housing of a hitch block according to an exemplary embodiment.

Referring to FIG. 6, FIG. 7, and FIG. 8, in an exemplary embodiment, the base 18 of the king ball 16 includes a female 7-pin electrical connector 78 mounted therein. The female 7-pin electrical connector 78 is connected to the wiring harness 80 of the trailer 12. The housing 32 of the hitch block 28 includes a male 7-pin electrical connector 82 mounted at the rear of the throat 38. The male 7-pin electrical connector 82 is connected to the wiring harness 84 of the tow vehicle 14.

When the base 18 of the king ball 16 is inserted into the throat 38 of the housing 32 the female 7-pin electrical connector 78 engages the male 7-pin electrical connector 82. When the female 7-pin electrical connector 78 engages the male 7-pin electrical connector 82, the wiring harness 84 of the tow vehicle 14 is connected to the wiring harness 80 of the trailer 12 through the hitch assembly 10. The female 7-pin electrical connector 78 and the male 7-pin electrical connector 82 are self-aligning, and engage one another automatically when the base 18 of the king ball 16 is inserted into the throat 38 of the housing 32 of the hitch block 28. The driver of the tow vehicle 14 does not need to leave the tow vehicle 14 to hook up lights on the trailer 12 after the trailer 12 is hitched to the tow vehicle 14.

Referring to FIG. 8, in an exemplary embodiment, the female 7-pin electrical connector 78 is positioned within a pocket 86 formed in the base 18 of the king ball 16. The pocket 86 includes a pair of spring loaded pivotable base doors 88. The base doors 88 are biased to a closed position, wherein the base doors 88 are adapted to keep debris from entering the pocket 86 when the king ball 16 is not engaged with the hitch block 28. When the base 18 of the king ball 16 is inserted into the throat 38 of the housing 32, the male 7-pin electrical connector 82 contacts the base doors 88, and the base doors 88 pivot away, as shown by arrows 90, to allow the male 7-pin electrical connector 82 to enter the pocket 86 and engage the female 7-pin electrical connector 78.

Figure 9A:
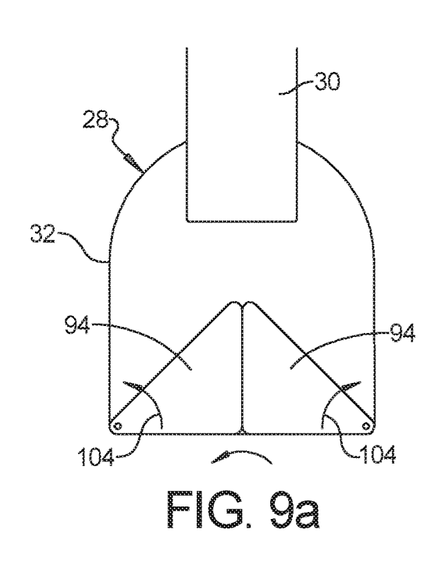
FIG. 9a is a top view of a hitch block housing according to an exemplary embodiment, wherein second and third housing doors are closed.
Figure 9B:
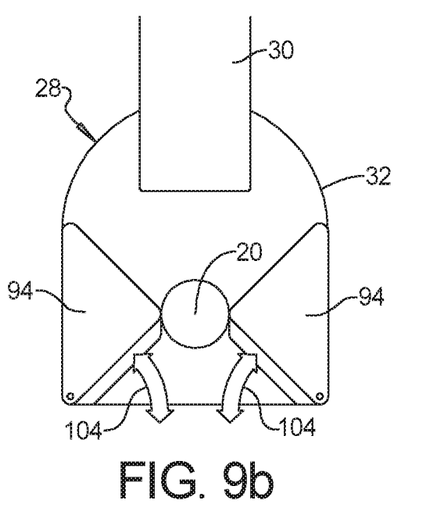
FIG. 9b is a top view of the hitch block housing shown in FIG. 9a, wherein second and third housing doors are open.

Referring to FIG. 5, FIG. 9a, and FIG. 9b, in another exemplary embodiment, the housing 32 includes a plurality of spring-loaded housing doors 92, 94. The housing doors 92, 94 are adapted to keep debris from entering the throat 38 of the housing 32 when the king ball 16 is not engaged with the hitch block 28. When the base 18 of the king ball 16 is inserted into the throat 38 of the housing 32, the base 18 of the king ball 16 contacts the housing doors 92, 94, and the housing doors 92, 94 pivot away to allow the base 18 of the king ball 16 to enter the throat 38 of the housing 32.

As shown in FIG. 5, the housing 32 includes three housing doors 92, 94. A first housing door 92 extends vertically across an opening to the throat 38 of the housing 32 and is connected by a spring biased hinge 96 to a bottom edge 98 of the opening to the throat 38 of the housing 32. The first housing door is adapted to pivot inward, about an axis 100 of the spring biased hinge 96, as indicated by arrow 102. Second and third housing doors 94 are triangular shaped panels that are mounted onto the top surface 74 of the housing 32. The second and third housing doors 94 are adapted to pivot away in opposite directions as indicated by arrows 104.

When the base 18 of the king ball 16 is inserted into the housing 32, the base 18 contacts the first housing door 92 and the first housing door 92 pivots downward about the axis 100 of the spring biased hinge 96. As the base 18 enters the throat 38 of the housing 32, the king pin 20 contacts the second and third housing doors 94 and pivots them outward as the king ball 16 moves further into the throat 38 of the housing 32.

Figure 10:
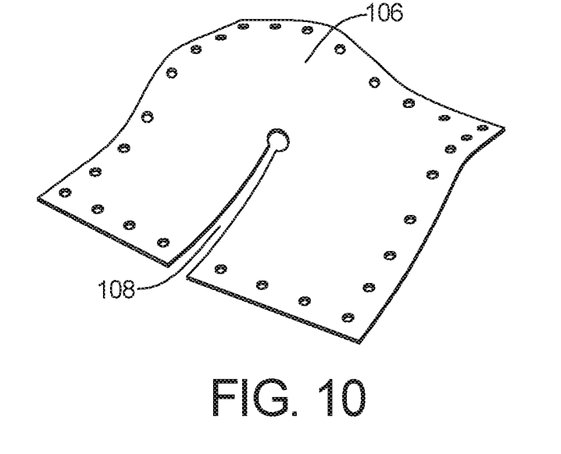
FIG. 10 is a perspective view of a cover according to an exemplary embodiment.

In another exemplary embodiment, a cover 106 made from a flexible material extends over the top of the housing 32 to keep debris from entering the throat 38 of the housing 32 when the king ball 16 is not present. The cover 106 includes a slot 108 formed therein. FIG. 10 shows a cover 106 removed from the housing 32. When the base 18 of the king ball 16 is inserted within the throat 38 of the housing 32, the cover 106 flexes to accommodate the king pin 20 and allow the base 18 of the king ball 16 to be inserted within the throat 38 of the housing 32.

Referring to FIG. 1, in an exemplary embodiment, the king ball 16 includes attachment points 110 adapted to allow safety chains 112 from the trailer 12 to be attached to the king ball 16. The hitch block 28 includes attachment points 114 adapted to allow safety chains 116 from the tow vehicle 14 to be attached to the hitch block 28. The safety chains 112, 116 can be connected to the king ball 16 and the hitch block 28 when the king ball 16 is attached to the hitch 26 of the trailer 12 and when the hitch block 28 is mounted to the receiver 34 of the tow vehicle 14. The driver of the tow vehicle 14 is not required to leave the tow vehicle 14 to attach safety chains 112, 116 after the king ball 16 is secured to the hitch block 28.

Referring again to FIG. 1, FIG. 5, and FIG. 11, the hitch block 28 includes a clip 118 adapted to connect to an emergency brake cable 120 of the trailer 12. The clip 118 is attached to the hitch block 28 by a breakable attachment 122. The breakable attachment 122 secures the clip 118 in position on the hitch block 28. The clip 118 is further connected to the tow vehicle 14 by a clip cable 124. The emergency brake cable 120 of the trailer 12 includes an eye 126 that is mounted to one of the trailer hitch 26 or the king ball 16 by a breakable attachment 128. The breakable attachment 128 secures the eye 126 in position on either the trailer hitch 26 or the king ball 16.

Figure 11:
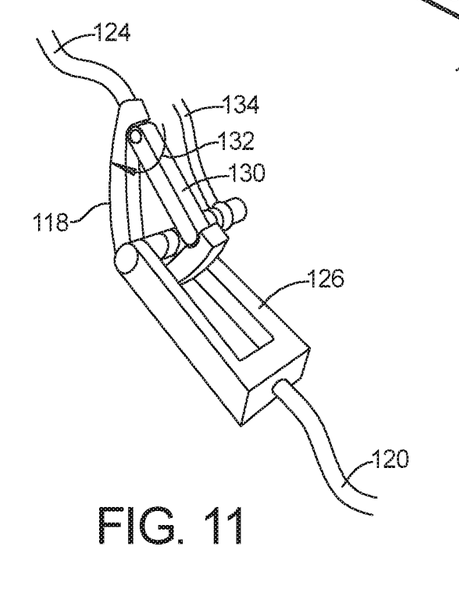
FIG. 11 is a perspective view of the clip and eye of a hitch assembly according to an exemplary embodiment.

The clip 118 and the eye 126 are positioned such that when the king ball 16 is inserted into the throat 38 of the housing 32, the eye 126 of the emergency brake cable 120 automatically engages the clip 118 to secure the emergency brake cable 120 to the hitch block 28. The clip 118 includes a pivotable gate portion 130 that pivots inward, as shown by arrow 132 to allow the eye 126 of the emergency brake cable 120 to enter the clip 118, and then springs back to stop the eye 126 of the emergency brake cable 120 from dis-engaging from the clip 118.

If the hitch assembly 10 fails during towing, and the trailer 12 is released from the tow vehicle 14, any tension on the emergency brake cable 120 will break the breakable attachments 122, 128 of the clip 118 and the eye 126. As the trailer 12 drifts further away from the tow vehicle 14, the clip 118 and the clip cable 124 will pull the emergency brake cable 120 of the trailer 12.

The hitch block 28 further includes a clip release cable 134 interconnecting the release handle 54 and the pivotable gate portion 130 of the clip 118. When the release handle 54 is actuated to release the locking mechanism 46 of the hitch block 28, the clip release cable 134 pulls the pivotable gate portion 130 of the clip 118 to allow the eye 126 of the emergency brake cable 120 to dis-engage from the clip 118. In an exemplary embodiment including a release cable 76 to allow the driver of the tow vehicle 14 to release the locking mechanism 46 without leaving the tow vehicle 14, the clip release cable 132 will simultaneously dis-engage the emergency brake cable 120. The driver of the tow vehicle 14 can dis-engage the locking mechanism 46 and the emergency brake cable 120 from within the tow vehicle 14.

A hitch assembly 10 of the present disclosure offers several advantages. The hitch assembly 10 of the present disclosure allows a king ball 16 to be attached to a trailer 12, a hitch block 28 to be attached to a tow vehicle 14, safety chains 112 to be attached between the king ball 16 and the trailer hitch 26 and safety chains 116 to be attached between the hitch block 28 and the tow vehicle 14 ahead of time. Thereafter, a driver of the tow vehicle 14 can back up to the trailer 12, engaging the king ball 16 and the hitch block 28. The king ball 16 and the hitch block 28 are automatically locked together with a primary and a secondary locking mechanism, the wiring harness 84 of the tow vehicle 14 is automatically connected to the wiring harness 80 of the trailer 12, and the emergency brake cable 120 of the trailer 12 is automatically secured to the tow vehicle 14.

The driver of the tow vehicle 14 can back up to and automatically connect to the trailer 12 without having to leave the tow vehicle 14. In addition, the hitch block 28 provides a visual indicator 66 to allow the driver of the tow vehicle 14 to look at the hitch block 28 through the tow vehicle's rear-view camera to verify that the king ball 16 is secured to the hitch block 28.

Further, a release cable 76 extending into the tow vehicle 14 will allow the driver of the tow vehicle 14 to dis-engage the locking mechanism 46 of the hitch block 28 and release the emergency brake cable 120 from the tow vehicle 14, without leaving the tow vehicle 14. The driver of the tow vehicle 14 can hook up to a trailer 12, drive away, stop, and dis-connect from the trailer 12 and drive the tow vehicle 14 away, without leaving the tow vehicle 14.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A hitch assembly for coupling a trailer to a tow vehicle comprising:

a king ball including a base and a king pin extending vertically from a top surface of the base, the king pin including a ball positioned on a distal end opposite the base, the ball adapted to be pivotally received into a hitch of the trailer;

a hitch block including a draw bar and a housing, the drawbar adapted to be horizontally inserted into a receiver mounted onto the tow vehicle, the housing including a throat adapted to receive the base of the king ball; and a locking mechanism adapted to automatically engage the king pin when the base of the king ball is inserted into the throat of the housing to secure the base of the king ball within the throat of the housing and locking the king ball and the hitch block together, wherein the locking mechanism includes a jaw adapted to automatically engage the king pin when the base of the king ball is inserted into the throat of the housing to secure the base of the king ball within the throat of the housing and lock the king ball and the hitch block together, and a wedge adapted to automatically engage the jaw after the jaw engages the king pin to lock the jaw in engagement with the king pin.

2. The hitch assembly of claim 1, wherein:

the jaw is pivotally mounted in the housing and pivotable between a first jaw position, wherein the base of the king ball can be inserted into the throat of the housing assembly, and a second jaw position, wherein the jaw engages the king pin to prevent the base of the king ball from being removed from the throat of the housing assembly;

the wedge is pivotally mounted in the housing and pivotable between a first wedge position, wherein the jaw is freely pivotable between the first and second jaw positions, and a second wedge position, wherein the wedge engages the jaw to lock the jaw in the second jaw position and in engagement with the king pin;

further wherein, the jaw is biased toward the first jaw position and the wedge is biased toward the second wedge position, the jaw including a finger extending therefrom adapted to hold the wedge in the first wedge position when the jaw is in the first jaw position; and when the base of the king ball is inserted into the throat of the housing assembly, the king pin contacts the jaw, overcomes the bias of the jaw, and pivots the jaw from the first jaw position to the second jaw position, moving the finger away from the wedge and allowing the wedge to automatically be biased from the first wedge position to the second wedge position.

3. The hitch assembly of claim 2, further including a lever pivotally mounted within the housing and adapted to selectively pivot the wedge from the second wedge position to the first wedge position.

4. The hitch assembly of claim 3, further including an indicator extending from the lever into a slot formed within the housing assembly, wherein, when the wedge is positioned in the first wedge position the indicator is positioned at a first end of the slot formed within the housing assembly, and when the wedge is positioned in the second wedge position the indicator is positioned at a second end of the slot formed within the housing assembly, opposite the first end.

5. The hitch assembly of claim 4, wherein the slot is formed within a top surface of the housing and the indicator is visible in a rear-view camera of the tow vehicle.

6. The hitch assembly of claim 5, wherein the hitch block further includes a release handle connected to the lever to move the lever and selectively pivot the wedge from the second wedge position to the first wedge position to unlock the king ball from the hitch block.

7. The hitch assembly of claim 5, wherein the hitch block further includes a release cable connected to the lever and extending a distance from the hitch block, the cable adapted to allow the lever to be selectively and remotely actuated to pivot the wedge from the second wedge position to the first wedge position to unlock the king ball from the hitch block.

8. The hitch assembly of claim 1, wherein the housing includes a plurality of spring loaded doors adapted to keep debris from entering the throat of the housing when the king ball is not engaged with the hitch block and to pivot away to allow base of the king ball to be inserted within the throat of the housing assembly.

9. The hitch assembly of claim 1, wherein the housing includes a flexible cover with a slot formed therein, wherein the flexible cover is adapted to keep debris from entering the throat of the housing when the king ball is not engaged with the hitch block, and to flex to accommodate the king pin and allow the base of the king ball to be inserted within the throat of the housing assembly.

10. The hitch assembly of claim 1, wherein an inner surface of the throat of the housing has a profile that substantially matches a profile of the outer surface of the base of the king ball, wherein when the king ball is inserted and locked within the throat of the housing assembly; there is substantially no relative movement between the housing and the king ball.

11. The hitch assembly of claim 1, wherein the king ball includes attachment points adapted to allow safety chains from the trailer to be attached to the king ball; and the hitch block includes attachment points adapted to allow safety chains from the tow vehicle to be attached to the hitch block.

12. The hitch assembly of claim 1, wherein the hitch block includes a dip adapted to connect to an emergency brake cable of the trailer, wherein the emergency brake cable of the trailer is mounted to one of the trailer hitch or the king ball such that when the king ball is inserted into the throat of the housing assembly, the emergency brake cable automatically engages the dip to secure the emergency brake cable to the hitch block.

13. The hitch assembly of claim 12, wherein the clip includes a clip cable adapted to connect the clip to the tow vehicle and the clip is mounted onto the hitch block with a breakable attachment; wherein the dip is adapted to break free from the hitch block if the emergency brake cable pulls on the clip, further wherein if the king ball breaks free of the hitch block while the tow vehicle and the trailer are moving, the dip and the clip cable adapted to pull the emergency brake cable of the trailer.

14. The hitch assembly of claim 13, wherein the hitch block further includes a release handle to selectively unlock the locking mechanism to release the king ball from the hitch block, and a cable interconnecting the release handle to the clip, wherein actuation of the release handle to unlock the king ball from the hitch block releases the emergency brake cable from the clip.

15. The hitch assembly of claim 14, wherein the hitch block further includes a release cable connected to the release handle and extending a distance from the hitch block, the release cable adapted to allow the release handle to be selectively and remotely actuated to unlock the king ball from the hitch block.

16. A hitch assembly for coupling a trailer to a tow vehicle comprising:
    a king ball including a base and a king pin extending vertically from a top surface of the base, the king pin including a ball positioned on a distal end opposite the base, the ball adapted to be pivotally received into a hitch of the trailer;
    a hitch block including a draw bar and a housing, the drawbar adapted to be horizontally inserted into a receiver mounted onto the tow vehicle, the housing including a throat adapted to receive the base of the king ball; and
    a locking mechanism adapted to automatically engage the king pin when the base of the king ball is inserted into the throat of the housing to secure the base of the king ball within the throat of the housing and locking the king ball and the hitch block together; wherein the base of the king ball includes a female 7-pin electrical connector mounted therein, and the housing of the hitch block includes a male 7-pin electrical connector mounted at the rear of the throat, further wherein when the base of the king ball is inserted into the throat of the housing the female 7-pin electrical connector engages the male 7-pin electrical connector.

17. The hitch assembly of claim 16, wherein the female 7-pin electrical connector is connected to the wiring harness of the trailer and the male 7-pin electrical connector is connected to the wiring harness of the tow vehicle, wherein when the base of the king ball is inserted into the throat of the housing the wiring harness of the tow vehicle is connected to the wiring harness of the trailer through the hitch assembly.

18. The hitch assembly of claim 17, wherein the female 7-pin electrical connector is positioned within a pocket formed in the base of the king ball, the pocket including a spring loaded pivotable door adapted to keep debris from entering the pocket when the king ball is not engaged with the hitch block and to pivot away to allow the male 7-pin electrical connector to enter the pocket and engage the female 7-pin electrical connector when the base of the king ball is inserted within the throat of the housing assembly.

19. A hitch assembly for coupling a trailer to a tow vehicle comprising:
    a king ball including a base and a king pin extending vertically from a top surface of the base, the king pin including a ball positioned on a distal end opposite the base, the ball adapted to be pivotally received into a hitch of the trailer;
    a hitch block including a draw bar and a housing, the drawbar adapted to be horizontally inserted into a receiver mounted onto the tow vehicle, the housing including a throat adapted to receive the base of the king ball;
    a female 7-pin electrical connector positioned within a pocket formed in the base of the king ball and connected to the wiring harness of the trailer, and a male 7-pin electrical connector mounted within the throat of the housing of the hitch block and connected to the wiring harness of the tow vehicle, wherein when the base of the king ball is inserted into the throat of the housing the female 7-pin electrical connector engages the male 7-pin electrical connector and the wiring harness of the tow vehicle is connected to the wiring harness of the trailer through the hitch assembly;
    a clip mounted on the hitch block with a breakable attachment and adapted to connect to an emergency brake cable of the trailer, wherein the emergency brake cable of the trader is mounted to one of the trader hitch or the king ball such that when the king ball is inserted into the throat of the housing assembly, the emergency brake cable automatically engages the clip to secure the emergency brake cable to the hitch block;

a clip cable extending between and interconnecting the dip to the tow vehicle, wherein the dip is adapted to break free from the hitch block if the emergency brake cable pulls on the dip, further wherein if the king ball breaks free of the hitch block while the tow vehicle and the trailer are moving, the dip and the dip cable are adapted to pull the emergency brake cable of the trailer;

a locking mechanism adapted to automatically engage the king pin when the base of the king ball is inserted into the throat of the housing to secure the base of the king ball within the throat of the housing and locking the king ball and the hitch block together, wherein the locking mechanism includes a jaw pivotally mounted in the housing and pivotable between a first jaw position, wherein the base of the king ball can be inserted into the throat of the housing assembly, and a second jaw position, wherein the jaw engages the king pin to prevent the base of the king ball from being removed from the throat of the housing assembly, the jaw is biased toward the first jaw position and adapted to automatically engage the king pin when the base of the king ball is inserted into the throat of the housing to secure the base of the king ball within the throat of the housing and lock the king ball and the hitch block together, and a wedge pivotally mounted in the housing and pivotable between a first wedge position, wherein the jaw is freely pivotable between the first and second jaw positions, and a second wedge position, wherein the wedge engages the jaw to lock the jaw in the second jaw position and in engagement with the king pin, the wedge is biased toward the second wedge position and is adapted to automatically engage the jaw after the jaw engages the king pin to lock the jaw in engagement with the king pin.

* * * * *